United States Patent
Heninger et al.

(10) Patent No.: US 8,949,848 B2
(45) Date of Patent: Feb. 3, 2015

(54) REDUCING USAGE OF RESOURCE UTILIZED BY A VIRTUAL MACHINE WHOSE RESOURCE UTILIZATION IS ADVERSELY AFFECTING NEIGHBORING VIRTUAL MACHINES

(75) Inventors: Ivan M. Heninger, Selma, NC (US); Zachary H. Jones, Apex, NC (US); James K. Kochuba, Raleigh, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 13/589,684

(22) Filed: Aug. 20, 2012

(65) Prior Publication Data

US 2014/0053151 A1 Feb. 20, 2014

(51) Int. Cl.
G06F 9/46 (2006.01)
G06F 9/455 (2006.01)
G06F 15/173 (2006.01)

(52) U.S. Cl.
USPC .................. 718/104; 718/1; 709/226

(58) Field of Classification Search
None
See application file for complete search history.

(56) References Cited

U.S. PATENT DOCUMENTS

2009/0288088 A1* 11/2009 Orii .............................. 718/102
2011/0185235 A1* 7/2011 Iizuka ......................... 714/47.3
2011/0225299 A1* 9/2011 Nathuji et al. ................ 709/226
2012/0011499 A1* 1/2012 Conover et al. .................. 718/1
2012/0023492 A1 1/2012 Govindan et al.
2012/0137295 A1* 5/2012 Soetemans et al. ........... 718/100

OTHER PUBLICATIONS

Gupta et al, QoS Monitoring and Performance Profiling Tool, Oct. 18, 2005, HP Laboratories Palo Alto, p. 1,3.*
Gupta et al, Enforcing Performance Isolation Across Virtual Machines in Xen, May 4, 2006, HP Laboratories Palo Alto.*
Koh et al., "An Analysis of Performance Interference Effects in Virtual Environments," IEEE International Symposium on Performance Analysis of Systems & Software, 2007.
Mell et al., "The NIST Definition of Cloud Computing," Special Publication 800-145, Sep. 2011.

* cited by examiner

Primary Examiner — Abdullah Al Kawsar
Assistant Examiner — Michael Ayers
(74) Attorney, Agent, or Firm — Robert A. Voigt, Jr.; Winstead, P.C.

(57) ABSTRACT

A method, system and computer program product for managing resource utilization of virtual machines in a cloud computing environment. A cloud controller computes an index of the utilization of a resource by a virtual machine to determine its adverse impact on its neighboring virtual machine(s) that share the same resource. If the interference index is greater than a threshold, then the utilization of the resource by that virtual machine will be throttled or reduced provided that the servicing of its workload is not weighted at too high of a priority and that one or more of its neighboring virtual machines are not able to meet their service-level agreement requirements. In this manner, the adversely affected neighboring virtual machines may have its performance restored in meeting their service-level agreement requirements without having to add additional resources and/or be migrated to other areas of the cloud computing environment.

15 Claims, 6 Drawing Sheets

REDUCING USAGE OF RESOURCE UTILIZED BY A VIRTUAL MACHINE WHOSE RESOURCE UTILIZATION IS ADVERSELY AFFECTING NEIGHBORING VIRTUAL MACHINES

TECHNICAL FIELD

The present invention relates generally to cloud computing, and more particularly to reducing the usage of a resource (e.g., disk utilization, memory utilization, network utilization, processor utilization) utilized by a virtual machine whose resource utilization is adversely affecting neighboring virtual machines.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of physical resources of the computer. A guest operating system runs on each guest, and the guest appears to the guest operating system as a real computer. Each guest operating system may host one or more virtual machines.

Currently, when one or more virtual machines are over utilizing a resource(s) (e.g., disk I/O operations), such over utilization may adversely affect its neighboring virtual machines, such as preventing these virtual machines from effectively servicing their workloads so as to meet the requirements of their service-level agreements. A service-level agreement refers to a service contract where the level of service is formally defined.

When it is detected that the neighboring virtual machines are being adversely affected, additional resources may be provided to the adversely affected virtual machines and/or some of the adversely affected virtual machines may be migrated to other areas of the cloud computing environment to address the performance degradation. However, customers may have already exhausted their purchased resource allocation so providing additional resources may not be an option. Similarly, there may not be enough free resources in the cloud node to augment the virtual machine's local resource allocation. Furthermore, the migration technique is not desired as it assumes that unused resources exist elsewhere in the cloud, which may not be the case.

BRIEF SUMMARY

In one embodiment of the present invention, a method for managing resource utilization of virtual machines in a cloud computing environment comprises monitoring a utilization of a resource for the virtual machines. The method further comprises computing an index of utilization of the resource by a virtual machine to determine an adverse impact on one or more neighboring virtual machines that share the resource. In addition, the method comprises reducing, by a processor, a usage of the resource by the virtual machine in response to the index exceeding a threshold value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for managing resource utilization of virtual machines in a cloud computing environment. In one embodiment of the present invention, a cloud controller monitors a utilization of a resource (e.g., memory utilization, disk utilization, processor utilization, network utilization) for the virtual machines in the cloud computing environment. The cloud controller computes an index, referred to herein as the interference index, of the utilization of a resource by a virtual machine to determine its adverse impact on its neighboring virtual machine(s) that share the same resource. If the interference index is greater than a threshold, then the utilization of the resource by that virtual machine will be throttled or reduced provided that the servicing of its workload is not weighted at too high of a priority and that one or more of its neighboring virtual machines are not able to meet their service-level agreement requirements. In this manner, the adversely affected neighboring virtual machines may be able to have its performance restored in meeting their service-level agreement requirements without having to add additional resources and/or migrate at least some of the adversely affected virtual machines to other areas of the cloud computing environment.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
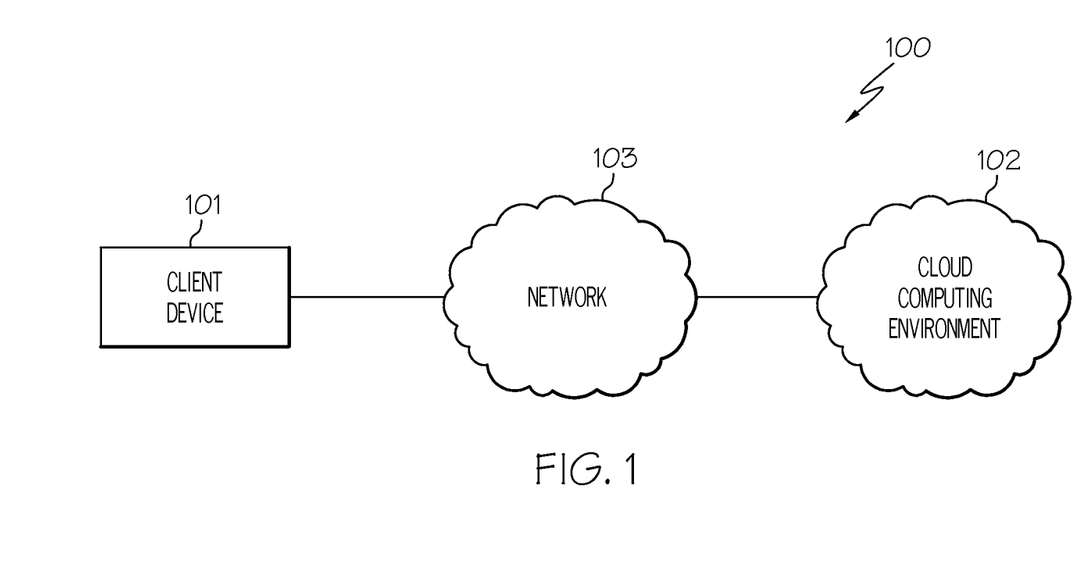
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
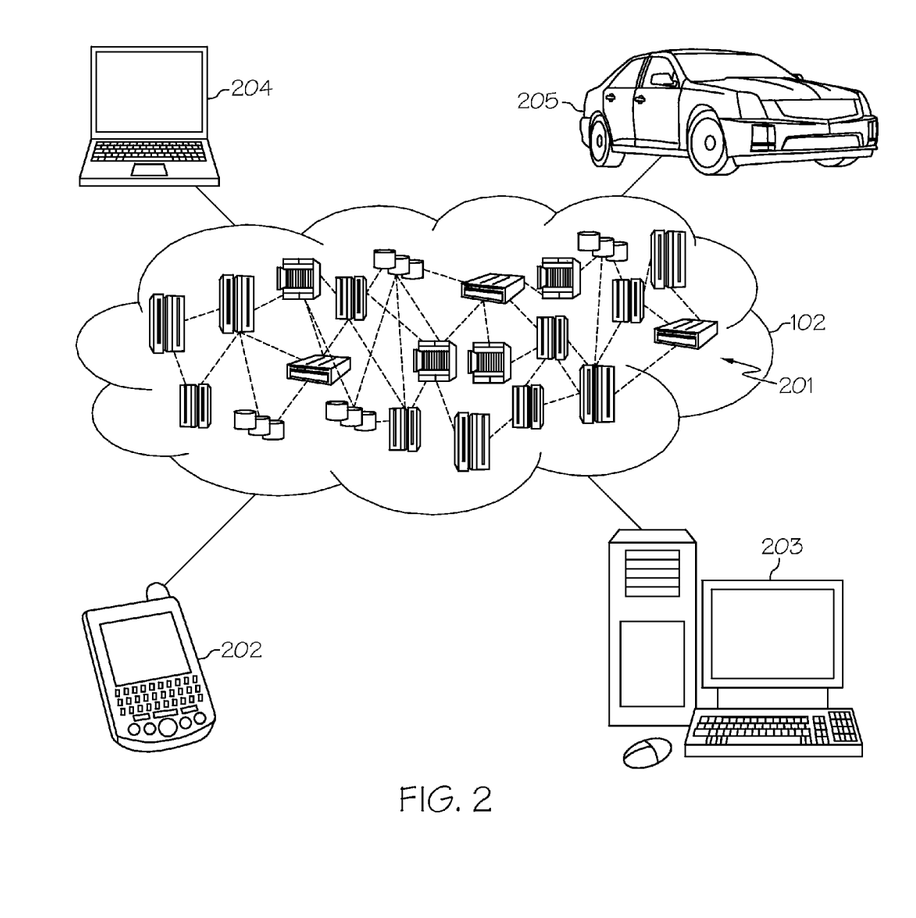
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing node 201 may store program code on a computer readable storage medium on the server computer. The server computer may download the program code to computing device 202, 203, 204, 205 for use on the computing device.

Figure 3:
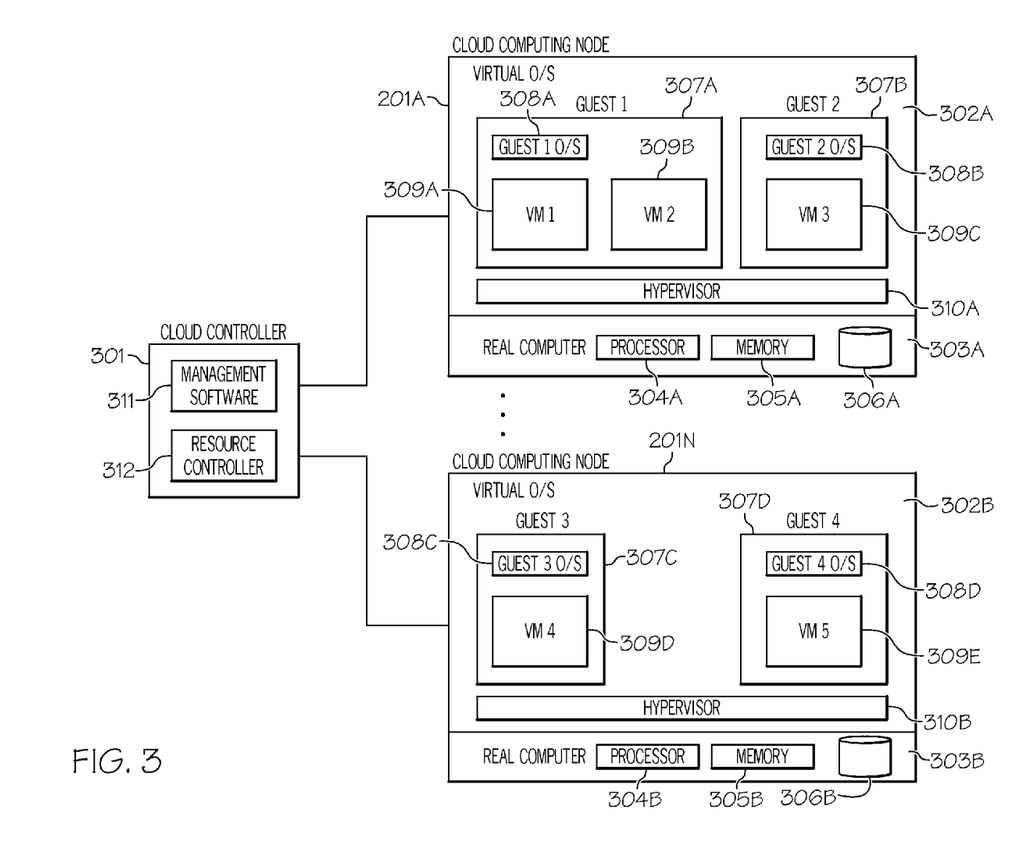
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to a cloud controller 301 configured to provide data center-level functions of communicating with hypervisors on cloud computing nodes 201 to throttle or reduce the utilization of a resource (e.g., memory, network, disk, processor) by a virtual machine whose utilization is adversely affecting its neighboring virtual machine(s) utilization of that resource as discussed further below. "Neighboring virtual machines," as used herein, refer to virtual machines that share the same resource and are physically located on the same hardware as the virtual machine whose utilization is adversely affecting its neighboring virtual machines.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1 and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3 and Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, cloud controller 301 supports a module, referred to herein as the management software 311, that can be used to manage all the hardware components of cloud computing nodes 201, monitor utilization of resources (e.g., memory, processor, disk, network) by virtual machines 309, intelligently deploy images of data and optimize the operations of cloud computing environment 102. Furthermore, management software 311 is configured to manage the resource utilization of virtual machines 309 in cloud computing environment 102 such as by instructing resource controller 312 (discussed further below) to throttle or reduce the utilization of a resource (e.g., memory, network, disk, processor) by virtual machine 309 whose utilization is adversely affecting its neighboring virtual machine(s) 309 utilization of that resource as discussed further below in connection with FIGS. 5A-5B.

Additionally, cloud controller 301 includes a module, referred to herein as the resource controller 312, that is configured to control the utilization of a resource (e.g., memory, processor, disk, network) by virtual machine 309. For example, if the utilization of the memory resource by virtual machine 309A was deemed to be adversely affecting the utilization of the memory resource by neighboring virtual machines 309B, 309C, then resource controller 312 may throttle or reduce the usage of the memory resource by virtual machine 309A so as to restore the performance of the neighboring virtual machines 309B, 309C. As will be discussed in greater detail below, an index, referred to herein as the "interference index," is used to assess the adverse affect of the utilization of a resource of a virtual machine 309 on its neighboring virtual machines 309 thereby providing guidance as to whether the utilization of the resource by virtual machine 309 needs to be throttled or reduced. A description of the hardware configuration of cloud controller 301 is provided further below in connection with FIG. 4.

Figure 4:
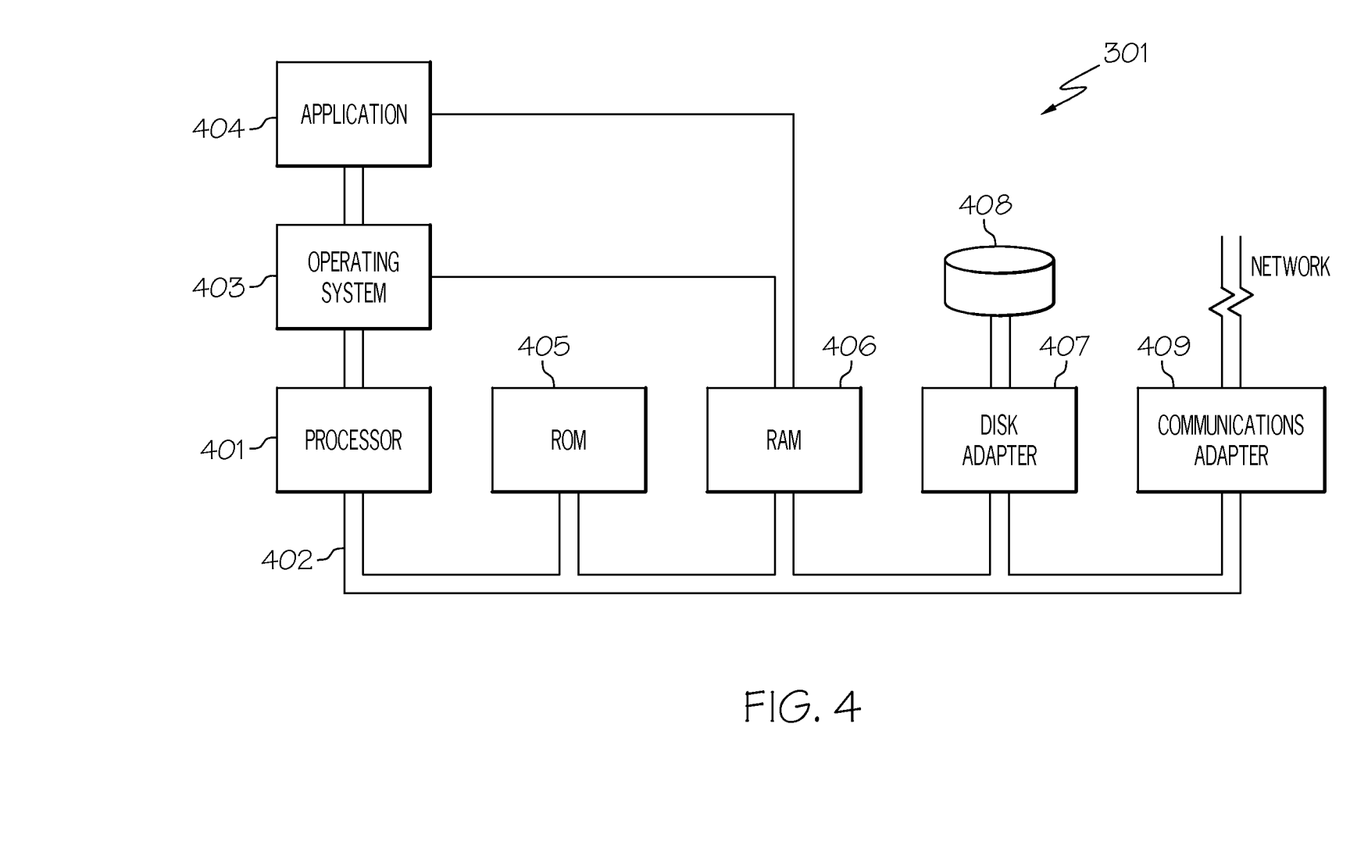
FIG. 4 illustrates a hardware configuration of a cloud controller configured in accordance with an embodiment of the present invention.

Referring now to FIG. 4, FIG. 4 illustrates a hardware configuration of cloud controller 301 (FIG. 4) which is representative of a hardware environment for practicing the present invention. Cloud controller 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program (e.g., management software 311, resource controller 312) for managing the resource utilization of virtual machines 309 (FIG. 3) in cloud computing environment 102 (FIGS. 1 and 2) as discussed further below in association with FIGS. 5A-5B.

Referring again to FIG. 4, read-only memory ("ROM") 405 is coupled to system bus 402 and includes a basic input/output system ("BIOS") that controls certain basic functions of cloud controller 301. Random access memory ("RAM") 406 and disk adapter 407 are also coupled to system bus 402. It should be noted that software components including operating system 403 and application 404 may be loaded into RAM 406, which may be cloud controller's 301 main memory for execution. Disk adapter 407 may be an integrated drive electronics ("IDE") adapter that communicates with a disk unit 408, e.g., disk drive. It is noted that the program for managing the resource utilization of virtual machines 309 in cloud computing environment 102, as discussed further below in connection with FIGS. 5A-5B, may reside in disk unit 408 or in application 404.

Cloud controller 301 may further include a communications adapter 409 coupled to bus 402. Communications adapter 409 interconnects bus 402 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, when one or more virtual machines are over utilizing a resource(s) (e.g., disk I/O operations), such over utilization may adversely affect its neighboring virtual machines, such as preventing these virtual machines from effectively servicing their workloads so as to meet the requirements of their service-level agreements. When it is detected that the neighboring virtual machines are being adversely affected, additional resources may be provided to the adversely affected virtual machines and/or some of the adversely affected virtual machines may be migrated to other areas of the cloud computing environment to address the performance degradation. However, customers may have already exhausted their purchased resource allocation so providing additional resources may not be an option. Similarly, there may not be enough free resources in the cloud node to augment the virtual machine's local resource allocation. Furthermore, the migration technique is not desired as it assumes that unused resources exist elsewhere in the cloud, which may not be the case.

The principles of the present invention provide a means for handling the situation of a virtual machine over utilizing a resource (e.g., memory, disk, processor, network) that adversely affects the performance of its neighboring virtual machines without the above-mentioned deficiencies. Instead, an interference index is computed for the virtual machine which is a measure of the adverse impact of the virtual machine's utilization of a resource on its neighboring virtual machines. If it is determined that the virtual machine is over utilizing the resource in such a manner that it as adversely affecting its neighboring virtual machines than deemed warranted, then the use of the resource by the virtual machine will be throttled or reduced to an acceptable level as discussed below in connection with FIGS. 5A-5B.

Figure 5A:
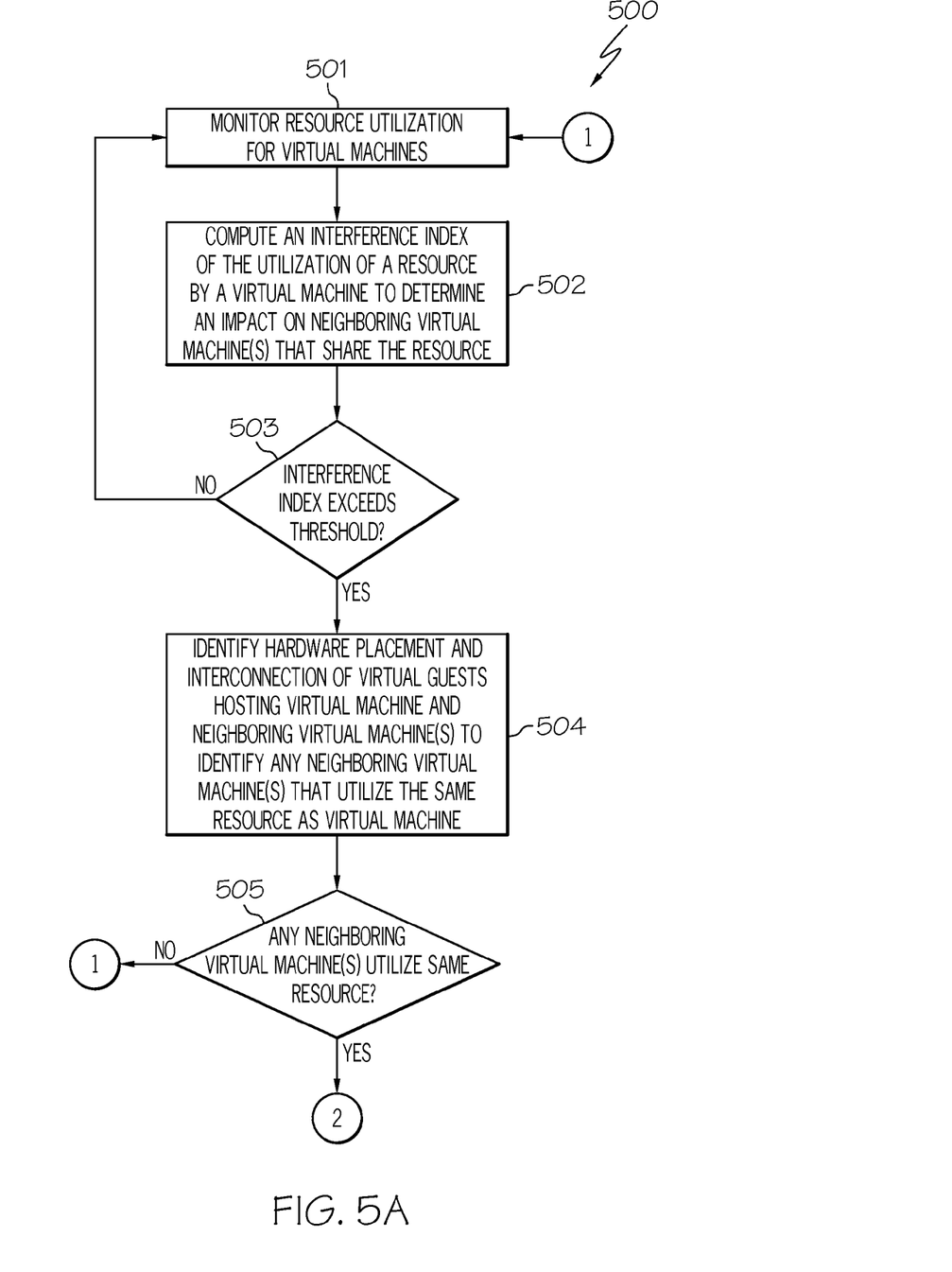
FIGS. 5A-5B are a flowchart of a method for managing the resource utilization of virtual machines in a cloud computing environment in accordance with an embodiment of the present invention.
Figure 5B:
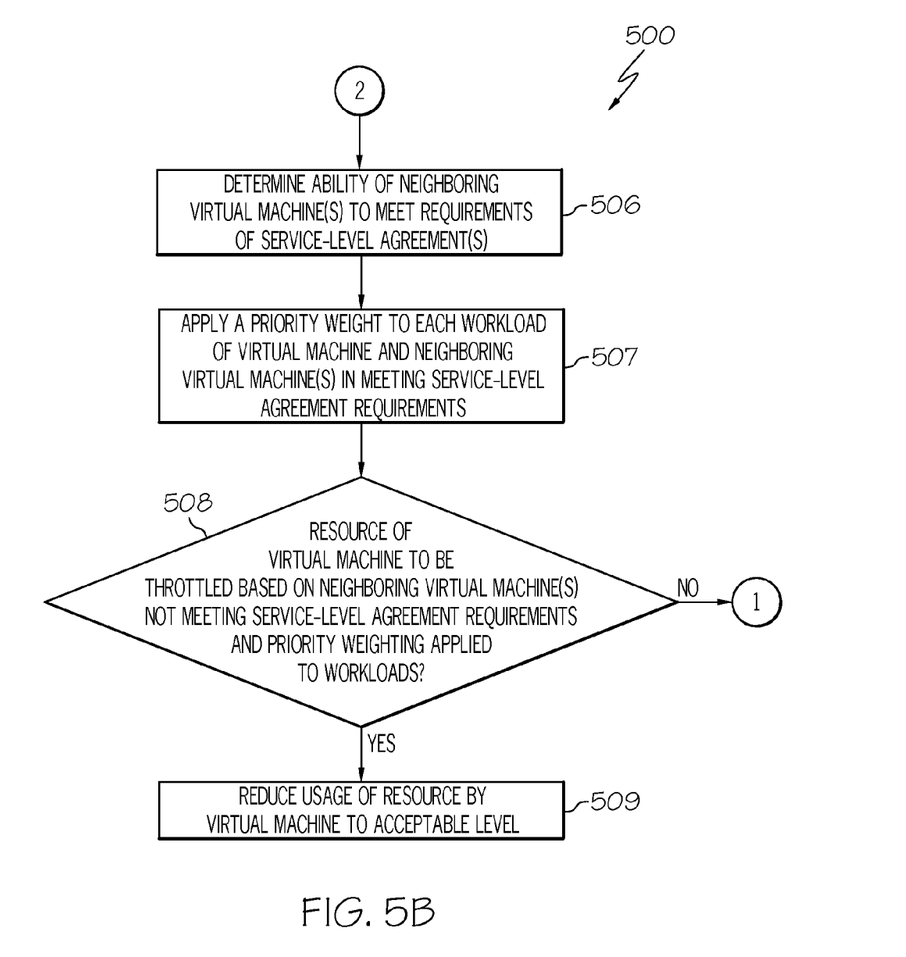

FIGS. 5A-5B are a flowchart of a method 500 for managing the resource utilization of virtual machines 309 (FIG. 3) in a cloud computing environment 102 (FIGS. 1 and 2) in accordance with an embodiment of the present invention.

Referring to FIG. 5A, in conjunction with FIGS. 1-4, in step 501, cloud controller 301 monitors the resource utilization (e.g., memory utilization, disk utilization, processor utilization, network utilization) for virtual machines 309 in cloud computing environment 102.

In step 502, cloud controller 301 computes an index, referred to herein as the interference index, of the utilization of a resource by virtual machine 309 (e.g., virtual machine 309A) to determine an adverse impact on its neighboring virtual machine(s) (e.g., virtual machines 309B-309C) that share the same resource. "Neighboring virtual machines," as used herein, refer to virtual machines 309 that share the same resource and are physically located on the same hardware as the virtual machine 309 whose utilization is adversely affecting its neighboring virtual machines 309. In one embodiment, the interference index quantifies a measure of what is referred to herein as the idle latency rate and the transaction latency rate. The idle latency rate is the latency rate when virtual machine 309 is idle. The transaction latency rate (also referred to as the application transaction latency rate or the systematic transaction latency rate) is the latency rate that virtual machine 309 is currently exhibiting for servicing its workload, including its normal or appropriate workload as well as when virtual machine 309 services an errant workload (deviating from regular or proper workload). When virtual machine 309 services an errant workload, the transaction latency rate will be higher than when virtual machine 309 services its normal or appropriate workload. As a result, the interference index will be able to differentiate between errant work from natural work as discussed further below.

In one embodiment, the interference index is represented in the following formula (EQ 1):

$$Y/(X+Y) \quad (\text{EQ 1})$$

where X corresponds to the idle latency rate (such as in ms) and Y corresponds to the transaction latency rate (such as in ms). As the interference index approaches 1, the greater adverse impact the virtual machine's 309 utilization of a resource has on its neighbors. Hence, when virtual machine 309 encounters a software bug (e.g., error in a computer program), then virtual machine 309 may increase its utilization of a resource performing errant work. As a result, the interference index will increase, becoming closer to 1. Hence, the use of the interference index provides a means for attempting to differentiate between errant work and natural/normal work.

In step 503, a determination is made by cloud controller 301 as to whether the interference index exceeds a threshold. If the interference index does not exceed the threshold, then cloud controller 301 continues to monitor the resource utilization (e.g., memory utilization, disk utilization, processor utilization, network utilization) for virtual machines 309 in cloud computing environment 102 in step 501.

If, however, the interference index exceeds a threshold, then it may be appropriate to throttle or reduce the utilization of the resource by virtual machine 309 (e.g., virtual machine 309A). In determining whether to throttle or reduce the utilization of the resource by virtual machine 309 (e.g., virtual machine 309A), cloud controller 301, in step 504, identifies the hardware placement and interconnection of virtual guests 307 hosting the virtual machine 309 (e.g., virtual machines 309A) and its neighboring virtual machine(s) 309 (e.g., virtual machines 309B, 309C) to identify any neighboring virtual machine(s) 309 (e.g., virtual machines 309B, 309C) that utilize the same resource as virtual machine 309 (e.g., virtual machine 309A). For example, after identifying the hardware placement and interconnection of virtual guests 307, cloud controller 301 could determine that guests 307A and 307C are on separate hypervisor hosts 310 (hypervisor 310A, hypervisor 310B, respectively) but share the same storage area network controller and network switch. As a result, virtual machines 309A-309B (hosted by guest 307A) and virtual machine 309D (hosted by guest 307C) could experience interference over disk and network resources but could not experience interference over processor and memory resources. Using such knowledge of guest relationships, cloud controller 301 improves its effectiveness in determining which virtual machines 309 would be adversely affected and selecting the appropriate resource to throttle.

In step 505, a determination is made by cloud controller 301 as to whether any neighboring virtual machine(s) 309 have been identified in step 504 that utilize the same resource as the virtual machine 309 (e.g., virtual machine 309A) whose interference index was computed in step 502 for the utilization of that resource.

If there were no neighboring virtual machines 309 that utilize the same resource as the virtual machine 309 (e.g., virtual machine 309A) whose interference index was computed in step 502 for the utilization of that resource, then cloud controller 301 continues to monitor the resource utilization (e.g., memory utilization, disk utilization, processor utilization, network utilization) for virtual machines 309 in cloud computing environment 102 in step 501.

If, however, cloud controller 301 identified neighboring virtual machine(s) 309 (e.g., virtual machines 309B, 309C) that utilize the same resource as virtual machine 309 (e.g., virtual machine 309A) whose interference index was computed in step 502, then, referring to FIG. 5B, in conjunction with FIGS. 1-4, in step 506, cloud controller 301 determines the ability of neighboring virtual machine(s) 309 to meet the requirements of their service-level agreement(s). As discussed above, a service-level agreement refers to a service contract where the level of service is formally defined. In this manner, it can be determined which neighboring virtual machines 309, if any, are not being able to fulfill their service-level agreement requirements as a result of the over utilization of the resource by virtual machine 309 (e.g., virtual machine 309A).

In step 507, cloud controller 301 applies a priority weight to each workload of virtual machine 309 (e.g., virtual machine 309A) and its neighboring virtual machine(s) 309 (e.g., virtual machines 309B, 309C) in meeting their service-level agreement requirements. In this manner, a weighted priority can be assigned to the workload being serviced by virtual machines 309. By assigning a weighted priority to a workload, the importance in servicing such a workload may be taken into account in determining whether to throttle or reduce the utilization of the resource by virtual machine 309 (e.g., virtual machine 309A). For example, while the over utilization of the resource by virtual machine 309A may adversely affect the utilization of the resource by virtual machines 309B, 309C, cloud controller 301 may not instruct resource controller 312 to throttle or reduce the utilization of the resource by virtual machine 309A if the servicing of its workload is very important (i.e., the servicing of its workload is weighted very high signifying a high priority).

In step 508, a determination is made by cloud controller 301 as to whether the resource of virtual machine 309 (e.g., virtual machine 309A) is to be throttled or reduced based on its neighboring virtual machine(s) 309 (e.g., virtual machines 309B, 309C) not meeting their service-level agreement requirements and the priority weighting applied to their workloads. For example, in one embodiment, throttling or reducing the utilization of a resource by a virtual machine 309 (e.g., virtual machine 309A) may be deemed to be appropriate if there are any neighboring virtual machines 309 not meeting their service-level agreement requirements and their priority is at least the same or higher in importance than the priority assigned to servicing the workload being performed by the virtual machine 309 over utilizing the resource. In another example, in one embodiment, throttling or reducing the utilization of a resource by a virtual machine 309 (e.g., virtual machine 309A) may be deemed to be appropriate by applying the following equation (EQ 2):

$$PW*WU \text{ of } VM \leq (PW*(1-WU) \text{ of } NVM1 + \ldots PW* (1-WU) \text{ of } NVMN) \quad (EQ\ 2)$$

where PW corresponds to the priority weight assigned for the workload for that virtual machine 309, where WU corresponds to the percentage utilization of that virtual machine's 309 workload, where NVM1 to . . . NVMN corresponds to a particular Neighboring Virtual Machine (NVM) 309, where N corresponds to a positive integer number. For example, if virtual machine 309A is over utilizing its resource which is adversely affecting its neighboring virtual machines 309B, 309C, and virtual machine 309A is meeting its service-level agreement requirements but virtual machines 309B and 309C are only meeting 60% of their service-level agreement requirements and the priority weight of servicing its workload to meet its service-level agreement requirements for virtual machines 309A, 309B and 309C is 0.4, 0.4 and 0.2, respectively, then a determination is made in EQ 2 as to whether 0.4*1 (1 corresponding to meeting its service-level agreement requirements) is $\leq$(0.4*0.4 (0.4 corresponding to the percentage of its workload that is not being serviced to meet its service-level agreement requirements))+(0.2*0.4 (0.4 corresponding to the percentage of its workload that is not being serviced to meet its service-level agreement requirements)). In this case, 0.4 is not $\leq$(0.16+0.08) and hence the utilization of the resource by virtual machine 309A would not be throttled or reduced due to the priority assigned to its workload. In another example, if virtual machine 309A is meeting its service-level agreement requirements but virtual machines 309B and 309C are only meeting 40% of their service-level agreement requirements and the priority weight of servicing its workload to meet its service-level agreement requirements for virtual machines 309A, 309B and 309C is 0.3, 0.5 and 0.2, respectively, then a determination is made in EQ 2 as to whether 0.3*1 (1 corresponding to meeting its service-level agreement requirements) is $\leq$(0.5*0.6 (0.6 corresponding to the percentage of its workload that is not being serviced to meet its service-level agreement requirements))+ (0.2*0.6 (0.6 corresponding to the percentage of its workload that is not being serviced to meet its service-level agreement requirements)). In this case, 0.3 is $\leq$(0.3+0.12) and hence the utilization of the resource by virtual machine 309A would be throttled or reduced due to the priority assigned to the workloads of virtual machines 309A, 309B and 309C and due to the inability of virtual machines 309B and 309C in meeting their service-level agreement requirements.

By using EQ 2, the total number of virtual machines 309 failing to meet their service-level agreement requirements as well as the priority assigned to such workloads may be used to determine whether to throttle or reduce the utilization of a resource by virtual machine 309 (e.g., virtual machine 309A) whose use has adversely affected its neighboring virtual machines 309.

If it determined that the resource of virtual machine 309 (e.g., virtual machine 309A) is to be throttled or reduced based on its neighboring virtual machine(s) 309 (e.g., virtual machines 309B, 309C) not meeting their service-level agreement requirements and the priority weighting applied to their workloads, then, in step 509, cloud controller 301 directs resource controller 312 to throttle or reduce the usage of the resource by virtual machine 309 (e.g., virtual machine 309A) to an acceptable level thereby allowing its neighboring virtual machine(s) 309 to restore its performance in meeting their service-level agreement requirements or at least improve its performance in meeting their service-level agreement requirements.

If, however, it is determined that the resource of virtual machine 309 (e.g., virtual machine 309A) is not to be throttled or reduced based on its neighboring virtual machine(s) 309 (e.g., virtual machines 309B, 309C) not meeting their service-level agreement requirements and the priority weighting applied to their workloads, then cloud controller 301 continues to monitor the resource utilization (e.g., memory utilization, disk utilization, processor utilization, network utilization) for virtual machines 309 in cloud computing environment 102 in step 501.

In some implementations, method 500 may include other and/or additional steps that, for clarity, are not depicted. Further, in some implementations, method 500 may be executed in a different order presented and that the order presented in the discussion of FIGS. 5A-5B is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing resource utilization of virtual machines in a cloud computing environment, the method comprising:
   monitoring a utilization of a resource for said virtual machines;
   computing an index of utilization of said resource by a virtual machine to determine an adverse impact on one or more neighboring virtual machines that share said resource due to utilization of said resource by said virtual machine, wherein said index of utilization is represented by Y/(X+Y), wherein said X corresponds to an idle latency rate, wherein said idle latency rate is a latency rate when said virtual machine is idle, wherein said Y corresponds to a transaction latency rate, wherein said transaction latency rate is a latency rate said virtual machine is currently exhibiting for servicing its workload; and reducing, by a processor, a usage of said resource by said virtual machine in response to said index exceeding a threshold value.

2. The method as recited in claim 1 further comprising:
   identifying a hardware placement and an interconnection of virtual guests hosting said virtual machine and said one or more neighboring virtual machines to identify said one or more neighboring virtual machines that utilize said resource as being utilized by said virtual machine.

3. The method as recited in claim 2 further comprising:
   determining an ability of said one or more neighboring virtual machines to meet requirements of their service-level agreements in response to identifying said one or more neighboring virtual machines that utilize said resource as being utilized by said virtual machine; and
   applying a weight to each workload of said virtual machine and said one or more neighboring virtual machines in response to identifying said one or more neighboring virtual machines that utilize said resource as being utilized by said virtual machine, wherein said weight is an indication of a priority in servicing that workload.

4. The method as recited in claim 3 further comprising:
   reducing said usage of said resource by said virtual machine based on one or more of said one or more neighboring virtual machines not meeting said requirements of their service-level agreements and said weight applied to each workload of said virtual machine and said one or more of said one or more neighboring virtual machines not meeting said requirements of their service-level agreements.

5. The method as recited in claim 1, wherein said transaction latency rate includes a latency as a result of performing errant work.

6. A computer program product embodied in a non-transitory computer readable storage medium for managing resource utilization of virtual machines in a cloud computing environment, the computer program product comprising the programming instructions for:
   monitoring a utilization of a resource for said virtual machines;
   computing an index of utilization of said resource by a virtual machine to determine an adverse impact on one or more neighboring virtual machines that share said resource due to utilization of said resource by said virtual machine, wherein said index of utilization is represented by Y/(X+Y), wherein said X corresponds to an idle latency rate, wherein said idle latency rate is a latency rate when said virtual machine is idle, wherein said Y corresponds to a transaction latency rate, wherein said transaction latency rate is a latency rate said virtual machine is currently exhibiting for servicing its workload; and
   reducing a usage of said resource by said virtual machine in response to said index exceeding a threshold value.

7. The computer program product as recited in claim 6 further comprising the programming instructions for:
   identifying a hardware placement and an interconnection of virtual guests hosting said virtual machine and said one or more neighboring virtual machines to identify said one or more neighboring virtual machines that utilize said resource as being utilized by said virtual machine.

8. The computer program product as recited in claim 7 further comprising the programming instructions for:
   determining an ability of said one or more neighboring virtual machines to meet requirements of their service-level agreements in response to identifying said one or more neighboring virtual machines that utilize said resource as being utilized by said virtual machine; and
   applying a weight to each workload of said virtual machine and said one or more neighboring virtual machines in response to identifying said one or more neighboring virtual machines that utilize said resource as being utilized by said virtual machine, wherein said weight is an indication of a priority in servicing that workload.

9. The computer program product as recited in claim 8 further comprising the programming instructions for:

reducing said usage of said resource by said virtual machine based on one or more of said one or more neighboring virtual machines not meeting said requirements of their service-level agreements and said weight applied to each workload of said virtual machine and said one or more of said one or more neighboring virtual machines not meeting said requirements of their service-level agreements.

10. The computer program product as recited in claim 6, wherein said transaction latency rate includes a latency as a result of performing errant work.

11. A system, comprising:

a memory unit for storing a computer program for managing resource utilization of virtual machines in a cloud computing environment; and a processor coupled to said memory unit, wherein said processor, responsive to said computer program, comprises:

circuitry for monitoring a utilization of a resource for said virtual machines;

circuitry for computing an index of utilization of said resource by a virtual machine to determine an adverse impact on one or more neighboring virtual machines that share said resource due to utilization of said resource by said virtual machine, wherein said index of utilization is represented by Y/(X+Y), wherein said X corresponds to an idle latency rate, wherein said idle latency rate is a latency rate when said virtual machine is idle, wherein said Y corresponds to a transaction latency rate, wherein said transaction latency rate is a latency rate said virtual machine is currently exhibiting for servicing its workload; and circuitry for reducing a usage of said resource by said virtual machine in response to said index exceeding a threshold value.

12. The system as recited in claim 11, wherein said processor further comprises:

circuitry for identifying a hardware placement and an interconnection of virtual guests hosting said virtual machine and said one or more neighboring virtual machines to identify said one or more neighboring virtual machines that utilize said resource as being utilized by said virtual machine.

13. The system as recited in claim 12, wherein said processor further comprises:

circuitry for determining an ability of said one or more neighboring virtual machines to meet requirements of their service-level agreements in response to identifying said one or more neighboring virtual machines that utilize said resource as being utilized by said virtual machine; and circuitry for applying a weight to each workload of said virtual machine and said one or more neighboring virtual machines in response to identifying said one or more neighboring virtual machines that utilize said resource as being utilized by said virtual machine, wherein said weight is an indication of a priority in servicing that workload.

14. The system as recited in claim 13, wherein said processor further comprises:

circuitry for reducing said usage of said resource by said virtual machine based on one or more of said one or more neighboring virtual machines not meeting said requirements of their service-level agreements and said weight applied to each workload of said virtual machine and said one or more of said one or more neighboring virtual machines not meeting said requirements of their service-level agreements.

15. The system as recited in claim 11, wherein said transaction latency rate includes a latency as a result of performing errant work.

\* \* \* \* \*